(12) United States Patent
Estevez et al.

(10) Patent No.: US 7,532,120 B2
(45) Date of Patent: May 12, 2009

(54) RFID POWER FROM HANDSET TRANSMISSIONS

(75) Inventors: Leonardo W. Estevez, Rowlett, TX (US); Steven C. Lazar, Jr., Plano, TX (US); Carl M. Panasik, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 153 days.

(21) Appl. No.: 11/459,085

(22) Filed: Jul. 21, 2006

(65) Prior Publication Data

US 2008/0018467 A1 Jan. 24, 2008

(51) Int. Cl.
*G08B 13/14* (2006.01)
(52) U.S. Cl. .............. 340/572.1; 340/10.34; 340/539.26
(58) Field of Classification Search .............. 340/572.1, 340/539.26, 693.1, 10.1, 10.34
See application file for complete search history.

(56) References Cited

U.S. PATENT DOCUMENTS

| 2005/0043594 | A1 | 2/2005 | Dinsmoor et al. |
| 2006/0190060 | A1 | 8/2006 | Greeninger et al. |
| 2006/0238308 | A1* | 10/2006 | Mickle et al. ............ 340/572.1 |
| 2007/0109116 | A1* | 5/2007 | Burr ...................... 340/539.12 |
| 2007/0109121 | A1* | 5/2007 | Cohen ................... 340/539.26 |

* cited by examiner

*Primary Examiner*—Thomas J Mullen
(74) *Attorney, Agent, or Firm*—Ronald O. Neerings; Wade James Brady, III; Frederick J. Telecky, Jr.

(57) ABSTRACT

A radio frequency identification (RFID) tag comprises a transceiver and a component coupled to the transceiver. The transceiver is adapted to wirelessly receive power from an RFID reader and/or from a mobile communication device. The power received from the mobile communication device is used to power the component, providing an alternative power source (cellular beacons) that uses no additional handset power.

17 Claims, 1 Drawing Sheet

RFID POWER FROM HANDSET TRANSMISSIONS

BACKGROUND OF THE INVENTION

1. Technical Field

The present disclosure relates generally to a wireless device that receives radio frequency (RF) energy from multiple RF transmission sources. More specifically, the present disclosure relates to an radio frequency identification (RFID) tag that, in addition to receiving RF energy from a corresponding RFID reader for RFID data communications, also receives RF energy from another wireless device, such as a cellular telephone, to power a component (e.g., a sensor) in the tag.

2. Background Information

Radio frequency identification (RFID) communications typically occur between an RFID-enabled reader and an RFID-enabled tag. The reader and the tag each comprise transceivers that wirelessly communicate with each other. In some implementations, the tag is passive. A passive tag does not have its own source of power and is thus temporarily powered by radio frequency (RF) energy transmitted by a near-by reader. The effective communication range for a reader and tag is typically fairly limited. In the absence of a reader (and its transmitted RF energy), a passive tag is generally unable to be powered on and perform useful work.

BRIEF SUMMARY

In accordance with at least some embodiments of the invention, a radio frequency identification (RFID) tag comprises a transceiver and a component coupled to the transceiver. The transceiver is adapted to wirelessly receive power from an RFID reader and from a mobile communication device. The power received from the mobile communication device is used to power the component.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct electrical or wireless connection, or through an indirect electrical or wireless connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

Figure 1:
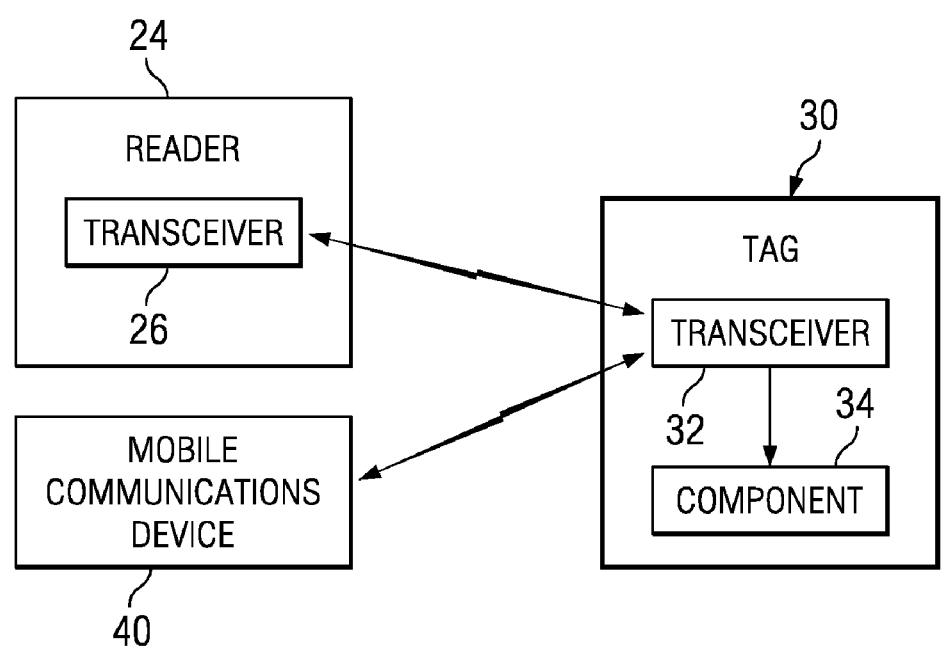
FIG. 1 shows a system in accordance with preferred embodiments of the invention.

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1 shows a preferred embodiment of the invention in which a reader 24 is able to wirelessly communicate with a tag 30. A mobile communication device 40 (e.g., a cellular telephone, wireless PDA, etc.) is also shown. The reader 24 comprises a transceiver 26. The tag 30 comprises a transceiver 32 and a component 34. If desired, other components may be included within the reader 24 and tag 30. The reader 24 and tag 30 may be RFID-compliant in accordance with some embodiments, and comply with other communication protocols in accordance with other embodiments.

Via the transceivers 26 and 32, the mobile device 40 and tag 30 wirelessly communicate with each other. In accordance with one embodiment of the invention, the reader 24 and the tag 30 are provided in accordance with the radio frequency identification (RFID) protocol. As such, the reader 24 comprises an RFID reader and the tag 30 comprises an RFID tag. Unless otherwise specified, as used herein, the term "tag" is not limited to the RFID context. The tag 30 preferably is positioned at a fixed location such as on a wall, furniture, or piece of equipment. Other embodiments comprise wireless devices other than RFID-based devices. For example, devices 24 and 30 may comprise ultra wide band (UWB) transceivers. The mobile communication device 40 preferably is not an RFID reader or RFID-compliant at all.

The reader 24 emits a periodic wireless beacon signal that, when in range of the tag's transceiver 32, causes the tag 30 to automatically echo back a wireless response signal along with an identifier associated with the tag. In general, the transceiver 32 reflects RF power (received from the reader) in a coded manner back to the reader 24. In at least some embodiments, the identifier differentiates the tag 30 from other tags. Upon receipt of the response signal, the reader 24 is able to determine that the reader is within range of the tag 30. The reader's 24 beacon signal may be automatically emitted at predetermined fixed or programmable periodic intervals. Additionally or alternatively, the reader 24 can be manually activated by its user to emit a beacon.

The tag 30 preferably is "passive" meaning that the tag does not have its own source of power. Instead, the tag's transceiver 32 derives power for the tag to operate from the wireless signal received from the reader 24. In accordance with embodiments of the invention, the tag's transceiver also derives power from wireless signals transmitted by the mobile communication device 40. In embodiments in which the mobile communication device 40 comprises a cellular telephone, the communication device emits periodic wireless signals ("beacons") to associate with, or maintain association with, a base station. When the tag 30 is within range of the mobile communication device 40 and is not in operative communication with reader 24, such periodic cellular signals transmitted from the mobile communication device are detected by the transceiver 32 in the tag 30 even though such wireless signals were intended for a base station for association purposes. In effect, tag 30 extracts operational power from cellular signals transmitted by the mobile communication device 40 intended for a base station.

The tag's receiver may be designed to operate in several modes. (1) Operation as a standard RFID receiver in which the tag gathers energy via RF interrogation at the standard RFID frequencies. (2) Operation as a cellular-mode receiver, in which energy is gathered from one or more of the standard cellular uplink frequencies. Beacons from the cellular handset may be used to prompt the RFID device to transmit its information or to perform other information gathering tasks as outlined below. Transmission (reflection/translation) of the RFID signal is in the RFID band. In this mode, energy harvesting of a nearly continuous RF signal source occur. (3) Operation as a dual-mode receiver, gathering energy from either standard RFID or cellular frequencies. In this mode, prompting of the RFID device may be either through the RFID or cellular frequency signals. As before, the reflection/translation of the RFID interrogation signal is in the RFID band. (4) Operation in which the Radio frequency source is not restricted to a standard RFID reader or cellular frequency signals.

The electrical power derived by the tag's transceiver 32 from the mobile communication device 40 preferably is used to power the component 34. The component 34 can be any type of, or part of, a peripheral device. Examples of such a peripheral device include a keyboard and a sensor. As a sensor, the component 34 may comprise a temperature sensor, a pressure sensor, or a physiological sensor (i.e., a sensor implanted in the human body). With power derived from the mobile communication device's wireless signal, the tag could power up the component 34 to, for example, take a reading such as temperature, pressure, blood oxygen level, etc. The reading could then be stored in non-volatile memory in the component 34 or transceiver 32 for transmission to the mobile communication device 40 or reader 24.

In accordance with at least some embodiments of the invention, the component 34, and tag 30 in general, preferably can be effectively operated with brief spurts of operational power provided by the received RF power, rectified and stored in a capacitor or equivalent component. That is, the tag 30 should be able to perform a task, or at least part of task, with power provided to it at discrete times. For example, the mobile communication device 40 may emit beacons at a rate of 5 beacons per second. The tag 30, and component 34 specifically, preferably operate to perform the function associated with the component 34 (e.g., sensor) with power arriving briefly 5 times per second.

The ability of the device 30 to harvest energy from mobile devices such as cell phones and WIFI devices enables the passive tag to perform other operations without an RFID reader such as capturing and recording environmental information via, for example, integrated temperature, light, pressure, RF, or audio sensors. In the case of RF sensing, the tag may be capable of receiving energy over a broad spectrum of frequencies. It may be able to capture and record the ID of a beaconing GSM cell phone or a mobile WIFI, BT, or WIMAX device. In the case of RF sensing, the RFID device 30 behaves in one mode as a normal RFID device when it is communicated with using specified standard protocols. Device 30 may behave as a mobile device powered sensor/recorder whenever a nearby mobile device provides signal strength strong enough for it to do so and the device 30 is not in operative communication with RFID reader 24. In this latter mode of operation, the device may simply write to an internal circular buffer (e.g., in the component 34) the data that it has sensed. If there is some means of extracting relative state or time between sensed events, so that the device may avoid writing multiple data points it recognizes to have occurred close together in time and may record whatever reference information might be utilized to extract a time base in the future. In the case of RF sensing, since a GSM cell phone (or a WIFI/WIMAX/BT device) is known to beacon at regular intervals, the beacons of one of these nearby stationary devices may be used to establish a time base for other sensed events.

In one embodiment, the tag might be considered a "snoop" tag which records a list of wirelessly beaconed IDs or medium access control (MAC) addresses over time. Such "snoop" tags may be placed at entry and exit points of public spaces (and transportation systems such as aircraft) to monitor for suspected criminals or unauthorized persons. A security person may scan the tags with a mobile device comprising an integrated RFID reader that connects to a network to flag potential suspects.

In some embodiments, the component 34 can be operated with power derived from both the reader 24 and mobile communication device 40 simultaneously or at different times depending on which of the reader 24 or mobile communication device 40 is within range of the tag 30.

While the preferred embodiments of the present invention have been shown and described, modifications thereof can be made by one skilled in the art without departing from the spirit and teachings of the invention. For example, the communication between the communication device and tag/reader can be infra-red (IR)-based instead of radio frequency (RF)-based as in the case of RFID. Further, in some embodiments, the tag wirelessly receives power from an external radio frequency (RF) source other than an RFID reader or mobile communication device. The scope of protection is not limited by the description set out above. Each and every claim is incorporated into the specification as an embodiment of the present invention.

What is claimed is:

1. A radio frequency identification (RFID) tag, comprising:
a transceiver; and
a component coupled to said transceiver;
wherein said transceiver is adapted to wirelessly receive power from an RFID reader and from a mobile communication device, said power received from said mobile communication device being used to power said component;
wherein said component receives identity information from said mobile communication device.

2. The RFID tag of claim 1 wherein said mobile communication device comprises a cellular telephone.

3. The RFID tag of claim 1 wherein said component comprises at least a portion of a keyboard.

4. The RFID tag of claim 1 wherein said component comprises a sensor.

5. The RFID tag of claim 4 wherein said sensor comprises a sensor selected from a group consisting of a temperature sensor, a pressure sensor, and a physiological sensor.

6. The RFID tag of claim 1 wherein said transceiver reflects power back to said RFID reader.

7. The RFID tag of claim 1 wherein power received from both the RFID reader and said mobile communication device is used to power the component.

8. The RFID tag of claim 1 wherein said component comprises a sensor and a buffer and said RFID tag stores sense data from said sensor in said buffer.

9. The RFID tag of claim 1 wherein said tag operates in a first mode and a second mode, said first mode being operable when said tag is in operative communication with said RFID reader and said second mode being operable when said tag is not in operative communication with said RFID reader but does receive power from said mobile communication device.

10. The RFID tag of claim 1 wherein said component extracts time base information from said mobile communication device.

11. The RFID tag of claim 1 wherein said identity information comprises a medium access control (MAC) address.

12. The RFID tag of claim 1 wherein the RFID tag wirelessly receives power from an external RF source other than an RFID reader or mobile communication device.

13. A method, comprising:
a wireless device operating in a first mode if said wireless device is in operative communication with an RFID reader; and
said wireless device operating in a second mode if said wireless device is not in operative communication with the RFID reader but does receive power wirelessly from a non-RFID mobile communication device;
wherein, while in said second mode, said wireless device receives identity information from said non-RFID mobile communication device.

14. The method of claim 1 wherein while in said second mode, said wireless device senses a parameter selected from a group consisting of temperature, pressure, audio, and a physiological parameter.

15. A method, comprising:
receiving at a transceiver of a tag a signal from a non-RFID communication device;
powering up a component in communication with the transceiver; and
receiving identity information from said non-RFID communication device.

16. A method of claim 15, further comprising:
taking a reading; and
storing said reading in a non-volatile memory in said component.

17. A method of claim 15, further comprising:
taking a reading; and
storing said reading in a non-volatile memory in said transceiver.

* * * * *